(12) United States Patent
Coffee (10) Patent No.: US 10,537,163 B2
(45) Date of Patent: Jan. 21, 2020

(54) COMPOSITION DISPENSING DEVICE

(71) Applicant: Kendy Coffee, San Antonio, TX (US)

(72) Inventor: Kendy Coffee, San Antonio, TX (US)

(*) Notice: Subject to any disclaimer, the term of this patent is extended or adjusted under 35 U.S.C. 154(b) by 344 days.

(21) Appl. No.: 15/350,256

(22) Filed: Nov. 14, 2016

(65) Prior Publication Data
US 2017/0295903 A1    Oct. 19, 2017

Related U.S. Application Data

(60) Provisional application No. 62/323,974, filed on Apr. 18, 2016.

(51) Int. Cl.
| | |
|---|---|
| *A45D 24/22* | (2006.01) |
| *A45D 19/02* | (2006.01) |
| *A01K 13/00* | (2006.01) |
| *A45D 19/00* | (2006.01) |

(52) U.S. Cl.
CPC ............ *A45D 19/02* (2013.01); *A01K 13/002* (2013.01); *A45D 2019/005* (2013.01); *A45D 2019/0033* (2013.01); *A45D 2019/0066* (2013.01)

(58) Field of Classification Search
CPC ......... A45D 19/02; A45D 24/22; A45D 24/26
See application file for complete search history.

(56) References Cited

U.S. PATENT DOCUMENTS

| | | | | |
|---|---|---|---|---|
| 1,646,324 A | * | 10/1927 | Stewart ................ | A45D 19/02 215/228 |
| 5,443,321 A | * | 8/1995 | Dolan ................. | A01K 13/002 132/112 |
| 5,649,502 A | * | 7/1997 | Frank .................. | A01K 13/001 119/665 |
| 2007/0068544 A1 | * | 3/2007 | Hackl .................. | A45D 24/22 132/113 |
| 2010/0071713 A1 | * | 3/2010 | Simon ................ | A01K 13/002 132/115 |

* cited by examiner

*Primary Examiner* — Rachel R Steitz
(74) *Attorney, Agent, or Firm* — Ariel S. Bentolila; Bay Area IP Group, LLC (57) ABSTRACT

A composition dispensing device engages a body surface, such as the scalp, while simultaneously dispensing a composition from an attached container on the surface. The device detachably joins a container of a composition and enable uniform dispensing and application of the composition on a body surface. The device comprises a housing that detachably joins with a container of composition. A platform having a plurality of apertures rests coplanar with the housing. A plurality of conduits, or hollow bristles, extend from the platform. The conduits include channels that are in communication with the housing and the container of composition. The conduits are arranged as inner and outer conduits, with the outer conduits being slightly longer to create a generally concave effect. The conduits terminate at an angled tip portion that engages the body surface, while simultaneously dispensing the composition from terminal openings or lateral openings formed at the tip.

19 Claims, 4 Drawing Sheets

COMPOSITION DISPENSING DEVICE

CROSS-REFERENCE TO RELATED APPLICATIONS

The present Utility patent application claims priority benefit of the U.S. provisional application for patent Ser. No. 62/323,974 entitled "SCALP N' GO ADAPTER" filed 18 Apr. 2016 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a composition dispensing device. More particularly, certain embodiments of the invention relates to a composition dispensing device that provides a housing that detachably joins with a container of composition, and a plurality of conduits, or hollow bristles, that extend from a platform and are in communication with the container and the housing while engaging a body surface, such as the head, to simultaneously dispense the composition at unique angles and massage the body surface.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that hair care is used to describe general hygiene and cosmetology involving the hair which grows from the human scalp, and to a lesser extent facial, pubic, and other body hair.

It is known that one method of styling hair is to apply a styling composition, e.g. a gel or a mousse, to the hair prior to combing, brushing the hair. This requires applying the styling composition by hand while moving the hair out of the way in a parting manipulation.

Generally, one way to distribute the hair's natural oils through the hair is by brushing with a natural bristle brush. The natural bristles effectively move the oil from the scalp through to the hair's mid-lengths and ends, nourishing these parts of the hair. Brushing the scalp also stimulates the sebaceous gland, which in turn produces more sebum.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/ services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see *Norian Corp.* v *Stryker Corp.*, 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of brushes and hair composition dispensing mechanisms that may be provided by preferred embodiments of the present invention. In one embodiment of the present invention, a composition dispensing device engages a body surface, such as the head while simultaneously dispensing a composition from an attached container on the surface.

Figure 1:
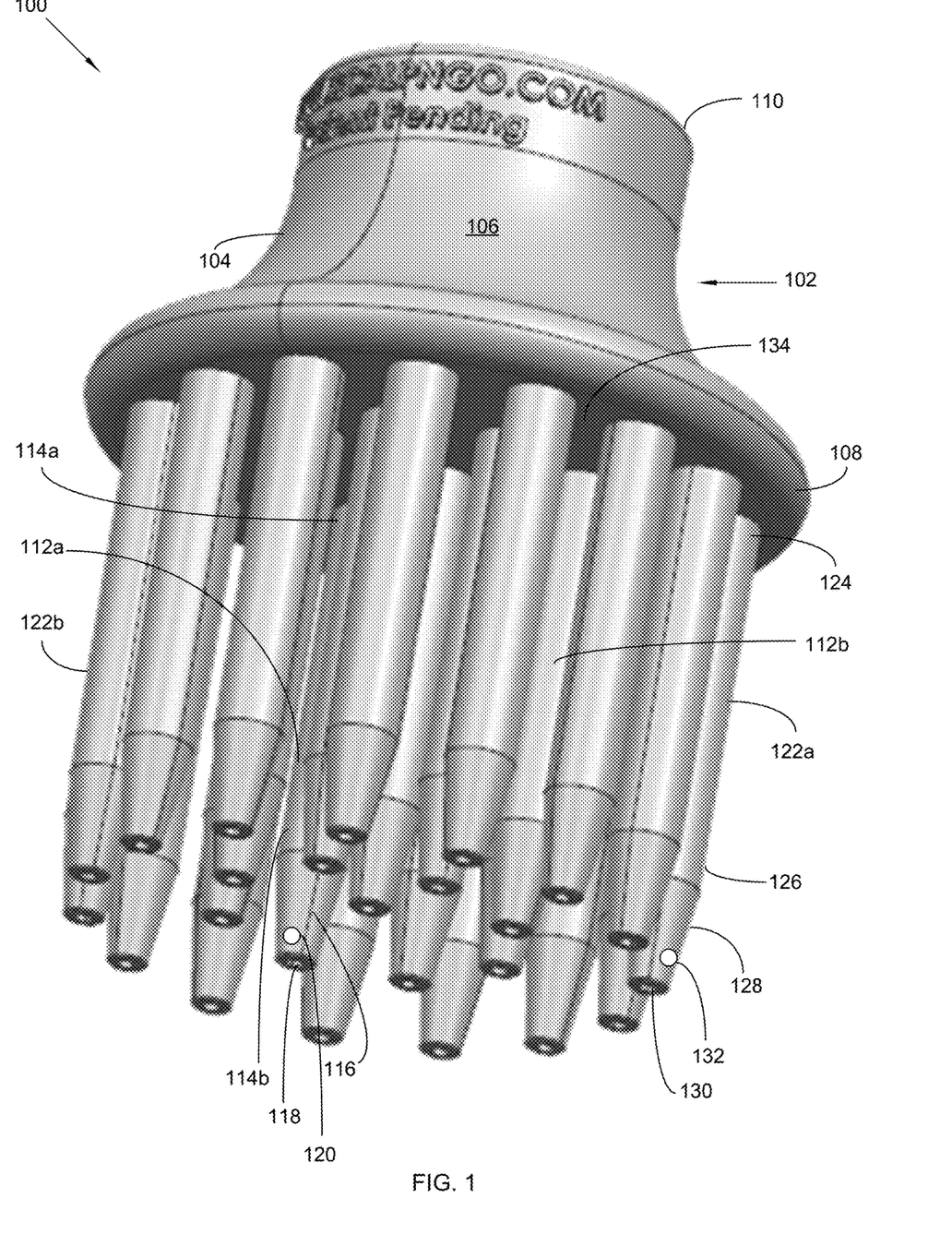
FIG. 1 illustrates a front perspective view of an exemplary composition dispensing device, in accordance with an embodiment of the present invention.

FIG. 1 illustrates a front perspective view of an exemplary composition dispensing device. In one aspect, a composition dispensing device 100 may be configured to detachably join a container of a composition and enable uniform dispensing, application, and massaging of the composition on a body surface, such as a scalp. In one embodiment, the composition dispensing device may provide a housing 102 that detachably joins with a container of composition. A platform having a plurality of apertures may be disposed generally coplanar to the housing. A plurality of conduits, or hollow bristles, may extend from the platform. The conduits may include channels that align with the apertures to be in communication with the housing and the container of composition.

In some embodiments, the conduits may be arranged in an inner and outer arrangement, with the outer conduits being slightly longer to create a generally concave effect. The conduits terminate at an angled tip portion that engages the body surface to dispense the composition from terminal openings or lateral openings for uniform distribution of the composition on the body surface and massaging of the body surface.

In one exemplary embodiment, the dispensing device may be configured to screw onto a scalp or skin treatment bottle and allow quick dispensing of shampoos, creams, liquid type scalp and skin treatments, medications, dyes or oils, directly to a scalp or to an animals skin without having to part or comb through the hair. The container may include a plastic bottle that contains between about 4-22 ounces of composition. In yet another embodiment, the device may have a generally light weight one piece all plastic design that allows the device to be easily cleaned with warm soapy water. Suitable materials for the device may include, without limitation, a polymer, polypropylene, polyurethane, polyvinyl chloride, a silicone, and rubber.

In some embodiments, the device may include a housing that has a generally tapered shape. In one embodiment, the housing has a bell-shape that is effective for storing and dispensing a liquid or gel. Though other shapes, sizes and dimensions for the housing may be used. The housing may be configured to detachably attach to various types of containers that contain a composition.

In some embodiments, the housing may be defined by a sidewall 104 having an inner surface and an outer surface 106. The housing may further be defined by a dispense end 108 and a mount end 110. The mount end may form a mount opening. The mount end may include a fastening mechanism. The fastening mechanism may include a threaded circumferential region running along the inner surface of the housing that threadably engages a container containing a composition.

In some embodiments, the device may include a platform. The platform may be disposed to traverse the dispense end of said housing. The platform may be generally coplanar to a horizontal plane of the dispense end of the housing. In this orientation, the platform crosses a cross section of the housing. The platform may be defined by a plurality of apertures. The apertures are in communication with the mount opening. In this manner, the composition form the attached container matriculates into the apertures through gravity or forcefully through air pressure.

In some embodiments, the device may include a plurality of first conduits 112a, 112b configured to extend outwardly, and generally perpendicular from the platform. The first conduits may be configured to perform the dual function of dispensing the composition and massaging the body surface simultaneously. The first conduits may include hollow bristles that are sufficiently rigid to massage the body surface. The first conduits are defined by a first channel that extends along the length of the first conduit. The first channel may be in communication with the apertures formed in the platform, such that the composition flows down the channel.

The first conduits may be defined by a first proximal end 114a and a first distal end 114b. The first distal end comprises a first tip portion 116 having a first terminal opening 118, or at least one first lateral opening 120, or both. The composition flows from the proximal end at the platform to the distal end where the openings are formed. The first terminal or lateral position of the first openings are configured to help distribute the composition uniformly.

In one exemplary embodiment, several lateral openings on opposite ends of the first tip portion may apply a hair dyes by having several openings opposite of each other on every tip. Thus, each tip will consist of several lateral, or side openings.

In some embodiments, the first tip portion may be configured to at least partially deviate from the first channel at an angle. This angle enhances the massaging effect and the composition distribution effect of the first conduits. In this manner, the angled nozzle tips may help guide the composition through the hair to more thoroughly access the scalp and skin area of the head.

The angled tip portion may also be effective for massaging the scalp and skin area to stimulate and enhance blood flow and break up dandruff and dry scalp issues on the scalp and skin area. Another possibility to the design of the tip portion may be to provide at least one lateral opening on the tips on the opposite sides of the tips instead of having the openings at the terminus of the tip portion. In this manner, dye products that are not intended to be applied directly to the scalp are applied close without be directly applied on the scalp and skin area.

In some embodiments, the device may include a plurality of second conduits 122*a*, 122*b*. The second conduits may be configured to perform the dual function of dispensing the composition and massaging the body surface simultaneously. The second conduits may include hollow bristles that are sufficiently rigid to massage the body surface. In some embodiments, the second conduits may be disposed generally parallel and at a circumferential periphery of the first conduits. In this manner, the first conduits and the second conduits form inner and outer conduits, respectively. In one embodiment, the outer, second conduits are slightly longer that the inner, first conduits, so as to create a generally concave effect for the overall conduits.

Similar to the first conduits, the second conduits may extend outwardly from the platform. The second conduits are defined by a second channel that extends along the length of the first conduit. The second channel may be in communication with the apertures formed in the platform, such that the composition flows down the second channel. The second conduits may be defined by a second proximal end 124 and a second distal end 126. The second distal end may include a second tip portion 128 having a second terminal opening 130, or at least one second lateral opening 132, or both.

The composition flows from the second proximal end at the platform to the distal end where the second openings are formed. The second terminal or lateral position of the second openings are configured to help distribute the composition uniformly. The second tip portion may be configured to at least partially deviate from the second channel at an angle. This angle enhances the massaging effect and the composition distribution effect of the second conduits.

In some embodiments, the first and second conduits comprises about twenty-four conduits disposed in a generally circular pattern. This circular patterns may be efficacious for facilitating more dispensing coverage and direct application of the composition without requiring the tips to be dragged along the scalp for application. The device may also be used as a massage device to stimulate blood flow to the scalp and skin area and to break up dandruff, and dry scalp conditions.

Figure 2:
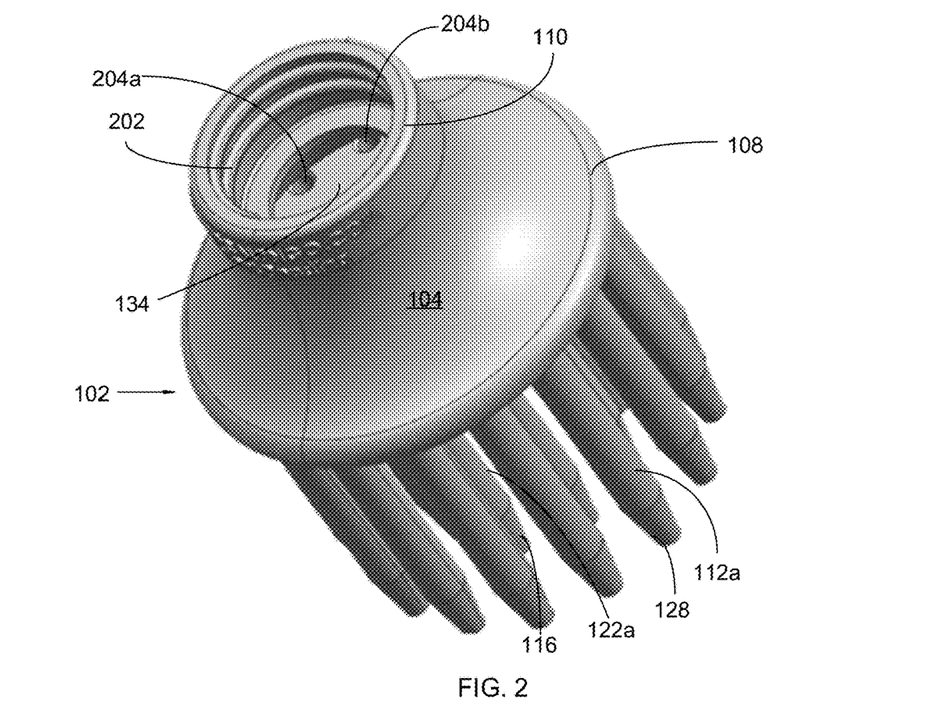
FIG. 2 illustrates a rear perspective view of a composition dispensing device, in accordance with an embodiment of the present invention.

FIG. 2 illustrates a rear perspective view of a composition dispensing device. In one aspect, a container that contains a composition may join with the mount end of the housing at a fastening mechanism 202. The fastening mechanism may include a threaded circumferential region running along the inner surface of the housing that threadably engages a container containing a composition. However in other embodiments, the fastening mechanism may include a neck that forms a friction fit relationship with a container neck.

In order for the composition to be applied to a scalp surface area, a user touches the tips to the surface area, and squeezes the composition bottled product which may force the composition to flow through the conduits to the surface area of the scalp. The container may include a plastic bottle containing a hair composition. The hair composition may include, without limitation, a hair dye, a hair moisturizer, a hair growth composition, a scalp moisturizer, and a lice medication.

In some embodiments, the composition flows from the container along the inner surface of the sidewalls of the housing. The composition may flow through a plurality of apertures 204*a*, 204*b* that form in the platform. After flowing through the apertures, the composition flows along the length of the channels in the conduits before being dispensed through the tips on the ends of the conduits.

The tips serve not only dispense the composition, but also uniformly massage the composition into the scalp. Further the tips are slightly angles to enhance distribution of the composition along the body surface. In this manner, the device may be designed to get to the surface area to apply the composition by the user not having to part or comb through the hair.

Figure 3:
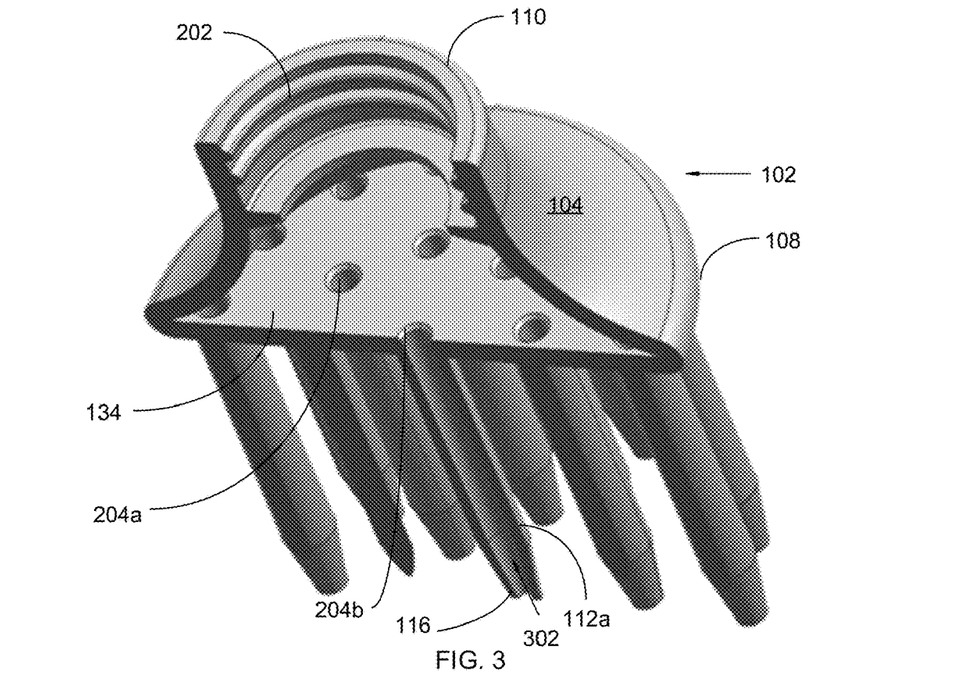
FIG. 3 illustrates a sectioned view of a composition dispensing device, showing an exemplary platform and conduits, in accordance with an embodiment of the present invention.

FIG. 3 illustrates a sectioned view of a composition dispensing device, showing an exemplary platform and conduits. In one aspect, the conduits carry the composition in two directions. In a first dispensing direction, the composition flows through a first channel 302 in the first conduits. The first channel carries the composition from the first proximal end to the openings at the first tip portion. In a collection direction, after completing dispensing of the composition, the housing and attached container may be flipped over to allow gravity to carry the composition back into the container through the same channels.

Similarly for the outer second conduits, in a first dispensing direction, the composition flows through a second channel in the second conduits. The second channel carries the composition from the second proximal end to the openings at the second tip portion. In a collection direction, after completing dispensing of the composition, the housing and attached container may be flipped over to allow gravity to carry the composition back into the container through the same channels.

Because of the hollowed and circular concave design of the conduits, application of the composition is efficient and thorough to an entire head in approximately sixty seconds. In some embodiments, the housing may have the capacity to screw onto many different types of scalp and shampoo treatment bottled products. When the treatment bottle is sitting upright, the design of the housing's hollowed bell shape allows the remaining composition inside the housing and channels of the conduits to drain back into the container of composition.

Figure 4:
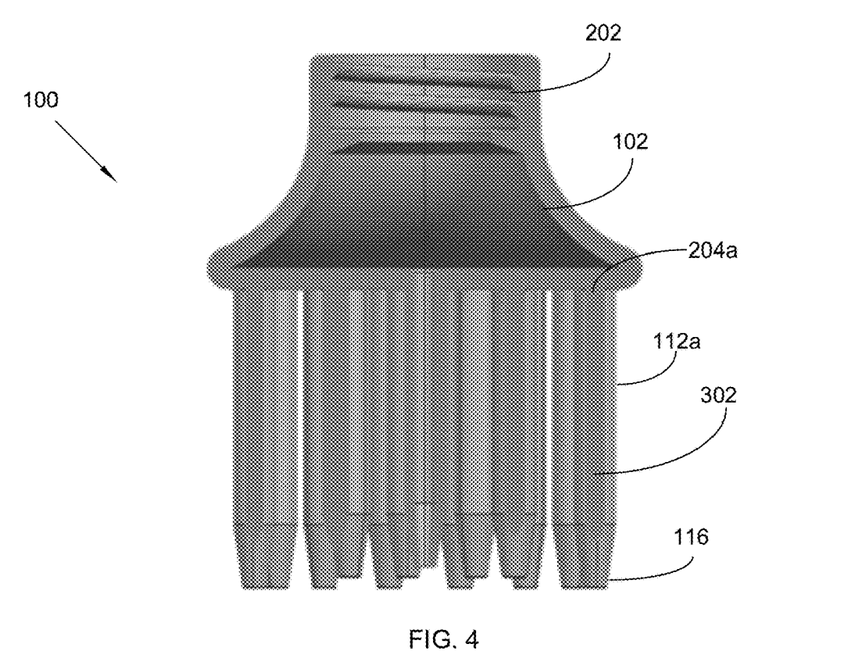
FIG. 4 illustrates a sectioned side view of a composition dispensing device, showing a housing joined with a plurality of outer conduits, in accordance with an embodiment of the present invention.

FIG. 4 illustrates a sectioned side view of a composition dispensing device, showing a housing joined with a plurality of outer conduits. In one aspect, the housing and the conduits join together, with the platform serving as a junction point. The fastening mechanism may provide a secure, sealed connection between the housing and the conduits. Since the composition is generally a liquid or a gel, the connection must be generally leak proof.

Figure 5:
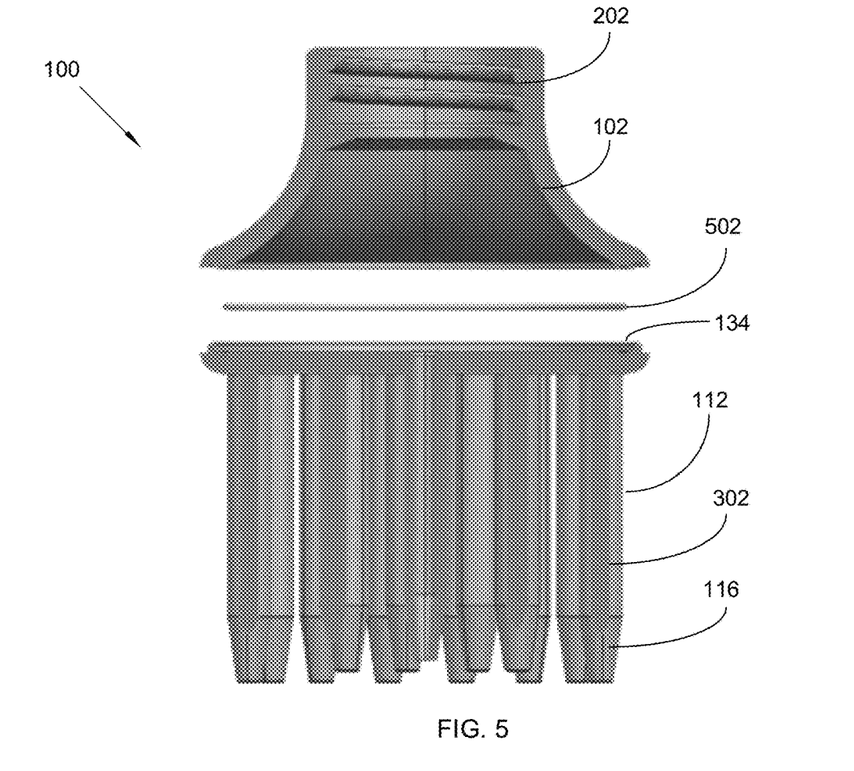
FIG. 5 illustrates a sectioned side view of a composition dispensing device, showing a housing separated from a plurality of outer conduits, in accordance with an embodiment of the present invention.

FIG. 5 illustrates a sectioned side view of a composition dispensing device, showing a housing separated from a plurality of outer conduits. In one aspect, a seal portion 502 may be positioned between the dispense end of the housing and the platform. The seal portion may be used to inhibit leakage of the composition from between the dispense end of the housing and the platform. The seal portion may include, without limitation, an O-ring, a gasket, and a rubber seal.

Figure 6:
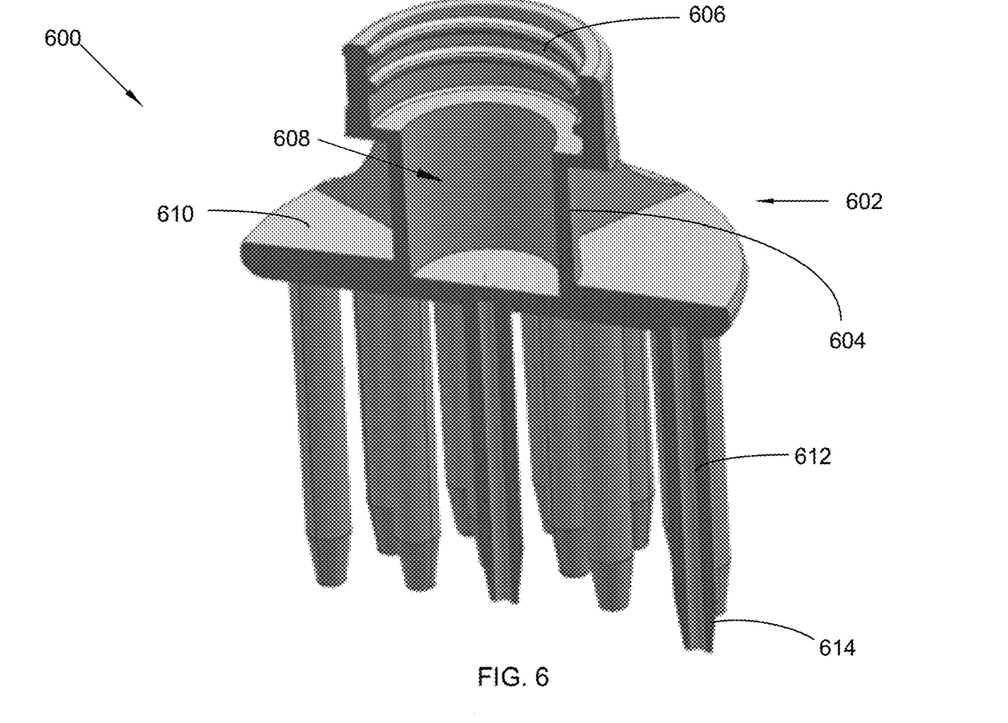
FIG. 6 illustrates a sectioned view of an exemplary alternative embodiment of a composition dispensing device, in accordance with an embodiment of the present invention.

FIG. 6 illustrates a sectioned view of an alternative embodiment of a composition dispensing device. In one aspect, an alternative composition dispensing device 600 may operate substantially the same as the device described above, except that a housing 602 is defined by an elongated neck 604, not the tapered bell shape. In one embodiment, the alternative device comprises a long neck with a top inner threaded surface area 606 that screws onto a treatment bottle. The neck may include a shaft 608 that leads to a thin circular hollow disc 610. The hollow disc may be configured to store and dispense the flow of the composiiton before the treatment flows through a plurality of conduits 612 and out through a tip 614, similar to the device discussed above.

Figure 7:
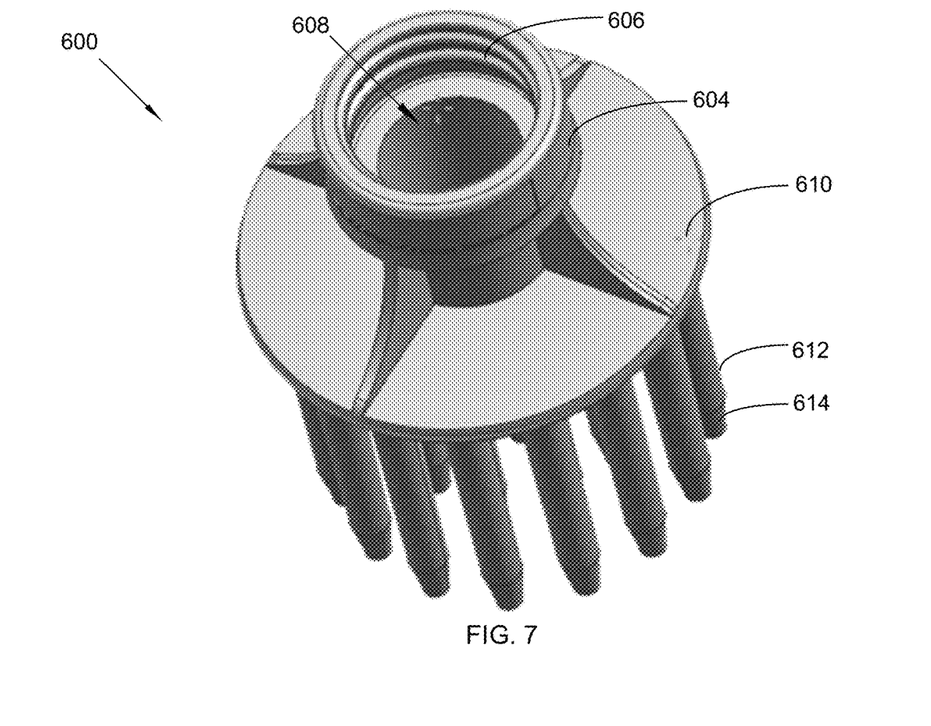
FIG. 7 illustrates a sectioned view of an alternative embodiment of a composition dispensing device, in accordance with an embodiment of the present invention.

FIG. 7 illustrates a sectioned view of an alternative embodiment of a composition dispensing device. In one aspect, the device operates substantially the same as the device discussed above. In some embodiments, both dispensing devices may be configured to screw onto a scalp or skin treatment bottle and allow quick dispensing of shampoos, creams, liquid type scalp and skin treatments, medications, dyes or oils, directly to a scalp or to an animals skin without having to part or comb through the hair.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a composition dispensing device configured to perform the dual function of dispensing the composition and massaging the body surface simultaneously according to the present invention will be apparent to those skilled in the art. Various aspects of the invention have been described above by way of illustration, and the specific embodiments disclosed are not intended to limit the invention to the particular forms disclosed. The particular implementation of the composition dispensing device configured to perform the dual function of dispensing the composition and massaging the body surface simultaneously may vary depending upon the particular context or application. By way of example, and not limitation, the composition dispensing device configured to perform the dual function of dispensing the composition and massaging the body surface simultaneously described in the foregoing were principally directed to brush that massages the scalp while applying a hair composition from an attached bottle implementations; however, similar techniques may instead be applied to applying conditioners on hides of animals, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A device consisting of:
   a housing comprising a sidewall having an inner surface and an outer surface, said housing further comprising a dispense end and a mount end being configured to form a mount opening, said mount end comprising a fastening mechanism;
   a platform being disposed to traverse said dispense end of said housing, said platform being defined by a plurality of apertures;
   a seal portion, said seal portion being disposed between said dispense end of said housing and said platform, said seal portion being configured to comprise an O-ring and help inhibit leakage between said and dispense end and said platform;
   a plurality of first conduits being configured to extend outwardly and generally perpendicular from said platform, said plurality of first conduits being defined by a first channel, said first channel being in communication with said plurality of apertures formed in said platform, said plurality of first conduits further being defined by a first proximal end and a first distal end, said first distal end comprising a first tip portion having a first terminal opening, or at least one first lateral opening, or both, said first tip portion being configured to at least partially deviate from said first channel at an angle; and
   a plurality of second conduits being disposed generally parallel and at a circumferential periphery of said plurality of first conduits, said plurality of second conduits being generally longer than said plurality of first conduits, said plurality of second conduits being configured to extend outwardly from said platform, said plurality of second conduits being defined by a second channel, said second channel being in communication with said plurality of apertures formed in said platform, said plurality of second conduits further being defined by an second proximal end and an second distal end, said second distal end comprising a second tip portion having a second terminal opening, or at least one second lateral opening, or both, said second tip portion being configured to at least partially deviate from said second channel at an angle,
   whereby said plurality of first conduits and said plurality of second conduits are arranged in a substantially circular pattern.

2. The device of claim 1, wherein said housing has a generally bell shape.

3. The device of claim 2, wherein said housing is fabricated from a polymer.

4. The device of claim 3, in which said platform is disposed generally coplanar to the dispense end of the housing.

5. The device of claim 4, in which said fastening mechanism comprises a threaded inner surface of said mount end.

6. The device of claim 5, in which said device further comprises a seal portion, said seal portion being disposed between said dispense end of said housing and said platform, said seal portion being configured to help inhibit leakage between said dispense end and said platform.

7. The device of claim 6, in which said seal portion comprises an O-ring.

8. The device of claim 7, wherein said seal portion is disposed at an outer perimeter of said dispense end of said housing.

9. The device of claim 8, wherein said housing and said platform are detachable through a friction fit relationship.

10. The device of claim 9, in which said plurality of first conduits and said plurality of second conduits comprises about twenty four conduits.

11. The device of claim 10, wherein said plurality of first conduits and said plurality of second conduits are semi-rigid.

12. The device of claim 11, in which said plurality of first conduits and said plurality of second conduits are configured to massage a body surface.

13. The device of claim 12, wherein said plurality of first conduits and said plurality of second conduits are disposed in a generally evenly-spaced relationship.

14. The device of claim 13, in which said plurality of first conduits and said plurality of second conduits have a generally elongated shape.

15. The device of claim 14, in which said first channel and said second channel is generally circular.

16. The device of claim 15, in which said first tip portion and said second tip portion are generally tapered.

17. The device of claim 16, wherein said housing of said device detachably joins with a container containing a composition.

18. The device of claim 17, in which said composition comprises a hair or scalp treatment composition.

19. A device consisting of:
   a housing being defined by a generally bell shape, said housing comprising a sidewall having an inner surface and an outer surface, said housing further comprising a dispense end and a mount end being configured to form a mount opening, said mount end comprising a fastening mechanism, said fastening mechanism comprising a threaded inner surface of said mount end;
   a platform being disposed to traverse said dispense end of said housing, said platform being defined by a plurality of apertures;
   a seal portion, said seal portion being disposed between said dispense end of said housing and said platform, said seal portion being configured to help inhibit leakage between said dispense end and said platform, said seal portion comprising an O-ring;
   a plurality of first conduits being configured to extend outwardly and generally perpendicular from said platform, said plurality of first conduits being defined by a first channel, said first channel being substantially circular, said first channel being in communication with said plurality of apertures formed in said platform, said plurality of first conduits further being defined by a first proximal end and a first distal end, said first distal end comprising a first tip portion having a first terminal opening, or at least one first lateral opening, or both, said first tip portion being configured to at least partially deviate from said first channel at an angle; and a plurality of second conduits being disposed generally parallel and at a circumferential periphery of said plurality of first conduits, said plurality of second conduits being generally longer than said plurality of first conduits, said plurality of second conduits being configured to extend outwardly from said platform, said plurality of second conduits being defined by a second channel, said second channel being substantially circular, said second channel being in communication with said plurality of apertures formed in said platform, said plurality of second conduits further being defined by an second proximal end and an second distal end, said second distal end comprising a second tip portion having a second terminal opening, or at least one second lateral opening, or both, said second tip portion being configured to at least partially deviate from said second channel at an angle, whereby said plurality of first conduits and said plurality of second conduits are arranged in a evenly spaced-apart, circular pattern.

* * * * *